(12) United States Patent
Belding et al.

(10) Patent No.: US 8,077,743 B2
(45) Date of Patent: Dec. 13, 2011

(54) METHOD AND APPARATUS FOR OFFSET INTERLEAVING OF VOCODER FRAMES

(75) Inventors: Peter Belding, San Diego, CA (US); James T. Determan, Encinitas, CA (US); Ronald Bloom, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1030 days.

(21) Appl. No.: 10/991,618

(22) Filed: Nov. 17, 2004

(65) Prior Publication Data

US 2006/0067328 A1 Mar. 30, 2006

Related U.S. Application Data

(60) Provisional application No. 60/523,476, filed on Nov. 18, 2003.

(51) Int. Cl.
*H04J 3/00* (2006.01)
*H04J 3/24* (2006.01)

(52) U.S. Cl. .................. 370/476; 370/474

(58) Field of Classification Search .......... 370/476, 370/395.5
See application file for complete search history.

(56) References Cited

U.S. PATENT DOCUMENTS

| | | | | |
|---|---|---|---|---|
| 3,652,998 A * | 3/1972 | Forney, Jr. | | 377/64 |
| 4,394,642 A * | 7/1983 | Currie et al. | | 341/81 |
| 4,559,625 A * | 12/1985 | Berlekamp et al. | | 714/701 |
| 4,742,517 A * | 5/1988 | Takagi et al. | | 714/702 |
| 5,056,105 A * | 10/1991 | Darmon et al. | | 375/130 |
| 5,483,541 A * | 1/1996 | Linsky | | 714/701 |
| 5,517,492 A * | 5/1996 | Spear | | 370/280 |
| 5,566,183 A * | 10/1996 | Partyka | | 714/701 |
| 5,572,532 A * | 11/1996 | Fimoff et al. | | 714/702 |
| 5,592,492 A * | 1/1997 | Ben-Efraim et al. | | 714/702 |
| 5,742,612 A * | 4/1998 | Gourgue et al. | | 714/701 |
| 5,898,698 A * | 4/1999 | Bross | | 714/701 |
| 5,933,431 A * | 8/1999 | Ko | | 370/476 |
| 5,991,857 A * | 11/1999 | Koetje et al. | | 711/157 |
| 6,067,646 A * | 5/2000 | Starr | | 714/701 |
| 6,151,690 A * | 11/2000 | Peeters | | 714/701 |
| 6,233,079 B1 | 5/2001 | Miyamori | | |
| 6,282,677 B1 * | 8/2001 | Inoue | | 714/701 |
| 6,334,197 B1 * | 12/2001 | Eroz et al. | | 714/701 |
| 6,463,556 B1 * | 10/2002 | Shaffner et al. | | 714/701 |

(Continued)

FOREIGN PATENT DOCUMENTS

JP 61115272 6/1986

OTHER PUBLICATIONS

G. David Forney, Jr., Burst-Correcting Codes for the Classic Bursty Channel, Oct. 1, 1971, pp. 772-781.

(Continued)

*Primary Examiner* — Warner Wong
(74) *Attorney, Agent, or Firm* — Abdollah Katbab; Ashish L. Patel (57) ABSTRACT

The disclosed embodiments provide methods and apparatus for offset interleaving of media frames for transmission over a communication network. In one aspect, a method for interleaving a stream of media frames for transmission over a communication network includes the acts of defining a plurality of packets and interleaving a stream of media frames among the packets.

15 Claims, 3 Drawing Sheets

U.S. PATENT DOCUMENTS

| | | | | |
|---|---|---|---|---|
| 6,493,815 | B1 * | 12/2002 | Kim et al. | 711/217 |
| 6,502,200 | B2 * | 12/2002 | Kashiwagi et al. | 713/400 |
| 6,543,013 | B1 * | 4/2003 | Li et al. | 714/701 |
| 6,560,748 | B2 * | 5/2003 | Li | 714/786 |
| 6,598,202 | B1 * | 7/2003 | Kim et al. | 714/786 |
| 6,631,491 | B1 * | 10/2003 | Shibutani et al. | 714/762 |
| 6,668,350 | B1 * | 12/2003 | Kim | 714/759 |
| 6,721,908 | B1 * | 4/2004 | Kim et al. | 714/702 |
| 6,754,202 | B1 * | 6/2004 | Sun et al. | 370/352 |
| 6,782,504 | B1 * | 8/2004 | Berrou et al. | 714/786 |
| 6,871,302 | B1 * | 3/2005 | Kawahara et al. | 714/701 |
| 6,895,011 | B1 * | 5/2005 | Lassers | 370/394 |
| 6,947,491 | B2 * | 9/2005 | Shahrier | 375/262 |
| 6,956,842 | B1 * | 10/2005 | Okumura et al. | 370/350 |
| 6,961,324 | B2 * | 11/2005 | Kilgore | 370/329 |
| 7,013,412 | B2 * | 3/2006 | Becker et al. | 714/702 |
| 7,039,069 | B2 * | 5/2006 | Hayashi | 370/474 |
| 7,069,490 | B2 * | 6/2006 | Niu et al. | 714/748 |
| 7,146,545 | B2 * | 12/2006 | Ohbuchi et al. | 714/701 |
| 7,263,637 | B2 * | 8/2007 | Ha et al. | 714/701 |
| 7,272,769 | B1 * | 9/2007 | Botha | 714/752 |
| 7,343,530 | B2 * | 3/2008 | Shin | 714/702 |
| 7,394,828 | B1 * | 7/2008 | Wu | 370/476 |
| 7,586,949 | B1 * | 9/2009 | Barany et al. | 370/474 |
| 7,953,062 | B2 * | 5/2011 | Sindhushayana et al. | 370/345 |
| 2002/0044612 | A1 * | 4/2002 | Sipola | 375/295 |
| 2002/0083248 | A1 | 6/2002 | Uto | 710/200 |
| 2002/0149496 | A1 * | 10/2002 | Dabak et al. | 340/825.56 |
| 2002/0159423 | A1 * | 10/2002 | Yao et al. | 370/342 |
| 2003/0053435 | A1 * | 3/2003 | Sindhushayana et al. | 370/342 |
| 2003/0108086 | A1 * | 6/2003 | Rastello et al. | 375/146 |
| 2003/0189956 | A1 * | 10/2003 | Tong et al. | 370/532 |
| 2003/0225985 | A1 * | 12/2003 | Suzuki et al. | 711/157 |
| 2004/0210812 | A1 | 10/2004 | Cameron et al. | 714/746 |
| 2004/0257250 | A1 * | 12/2004 | Sebire | 341/81 |
| 2005/0226272 | A1 * | 10/2005 | Luby et al. | 370/473 |
| 2006/0007950 | A1 * | 1/2006 | Okumura et al. | 370/441 |
| 2006/0165131 | A1 * | 7/2006 | Sebire | 370/506 |

OTHER PUBLICATIONS

John L. Ramsey, Realization of Optimum Interleavers, May 1, 1970, pp. 338-345.

International Search Report and Written Opinion—PCT/US2004/039129, International Search Authority—European Patent Office—Apr. 28, 2005.

* cited by examiner

METHOD AND APPARATUS FOR OFFSET INTERLEAVING OF VOCODER FRAMES

CROSS-REFERENCE TO RELATED APPLICATIONS

The present Application for Patent claims priority to Provisional Application No. 60/523,476 entitled "Method and Apparatus for Offset Interleaving" filed Nov. 18, 2003, and assigned to the assignee hereof and hereby expressly incorporated by reference herein.

STATEMENT REGARDING FEDERALLY SPONSORED RESEARCH OR DEVELOPMENT

The described embodiments were made with government support under United States government contract MDA904-01-G-0620/J.O. 0002 awarded by the National Security Agency (NSA), Maryland Procurement Office. The government may have certain rights in these described embodiments.

FIELD

The present invention relates to offset interleaving of media frames in a lossy communication network.

BACKGROUND

Present interleaving schemes of vocoder frames improve voice quality under packet loss conditions when multiple frames are bundled in a single packet; however, they generally add undesirable voice latency. Furthermore, these schemes require tracking state information in order to de-interleave the frames in the received packets.

There is a need, therefore, for interleaving mechanisms that are robust to dropped packets, minimize added voice latency, and do not require tracking state information for de-interleaving the frames in the received packets.

SUMMARY

The disclosed embodiments provide novel and improved methods and apparatus for offset interleaving of media frames to improve media quality and transmission latency. In one aspect, a method for interleaving a stream of media frames for transmission over a communication network includes the acts of defining a plurality of packets and interleaving a stream of media frames among the packets.

In another aspect, an apparatus for interleaving a stream of media frames for transmission over a communication network includes a processor carrying out the acts for implementing the above described methods.

BRIEF DESCRIPTION OF THE DRAWINGS

The features and advantages of the present invention will become more apparent from the detailed description of the embodiments set forth below.

DETAILED DESCRIPTION

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

Figure 1:
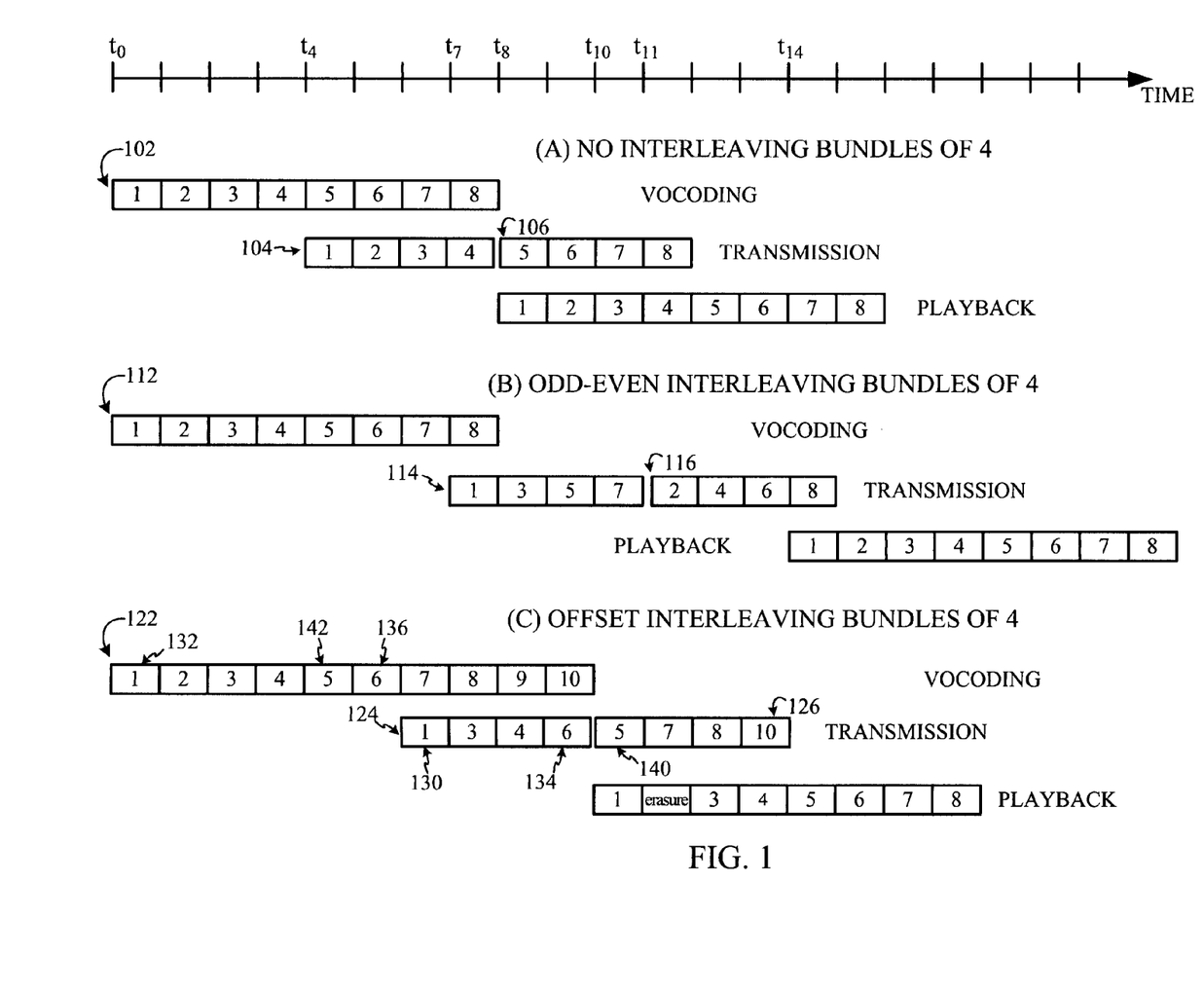
FIG. 1 illustrates an offset interleaving scheme, according to a first embodiment.

FIG. 1(A) illustrates one embodiment of transmitting vocoder frames in bundles (packets) of four frames. A portion of the media stream (e.g., data, video, voice, etc.) 102 is shown to be transmitted in two packets 104 and 106. Packet 104 includes the first four consecutive vocoder frames and at least packet 106 includes the following four consecutive vocoder frames of the data stream 102. Packet 104 gets transmitted at $t_4$, after the packet 104 is filled up with four consecutive vocoder frames, according to this embodiment. Similarly, packet 106 gets transmitted at $t_8$, after packet 106 is filled up with the following four consecutive vocoder frames, according to this embodiment. At the receiver, the first data vocoder frame of the first packet 104 is received at $t_8$, followed by the remaining frames. According to this embodiment, if some consecutive vocoder frames in a transmitted packet were lost, the loss of such frames would be reflected in the received data stream as a loss of consecutive frames and; hence, voice quality would severely suffer.

FIG. 1(B) illustrates another embodiment of transmitting vocoder frames in bundles (packets) of four frames. A portion of the data stream 112 is shown to be transmitted in two packets 114 and 116. Packet 114 includes the first four odd-numbered vocoder frames and packet 116 includes the interleaving four even-numbered vocoder frames of the data stream 112. Here, packet 114 gets transmitted at $t_7$, after packet 114 is filled up with the first four odd-numbered vocoder frames, e.g., 1, 3, 5, and 7, according to this embodiment. Similarly, packet 116 gets transmitted at $t_{11}$, after packet 116 is filled up with the first four even-numbered vocoder frames, e.g., 2, 4, 6, and 8, according to this embodiment. At the receiver, the first data vocoder frame of the first packet 114 is received at $t_{14}$, followed by the remaining frames. According to this odd-even interleaving embodiment, if some consecutive vocoder frames in a transmitted packet were lost, the loss of such frames would be reflected in the received data stream as a loss of intermittent frames and; hence, voice quality would not be as severely affected as in the first embodiment discussed above, i.e., with no interleaving. However, undesirable time latency has been introduced into the system, e.g., the data stream is received at $t_{14}$, which results in more delay as compared with the time delay of $t_8$ in the no-interleaving embodiment.

FIG. 1(C) illustrates another embodiment of transmitting vocoder frames in bundles (packets) of four frames. A portion of the data stream 122 is shown to be transmitted in two packets 124 and 126. Packet 124 includes four vocoder frames and packet 126 includes another four vocoder frames of the data stream 122, according to one offset interleaving scheme. Packet 124 gets transmitted at $t_6$, after packet 114 is filled up with four vocoder frames, e.g., 1, 3, 4, and 6, according to one embodiment. Similarly, packet 126 gets transmitted at $t_{10}$, after packet 126 is filled up with four vocoder frames, e.g., 5, 7, 8, and 10, according to one embodiment. At the receiver, the first data vocoder frame of the first packet 124 is received at $t_{10}$, followed by the remaining frames. According to this embodiment, if some consecutive vocoder frames in a transmitted packet were lost, the loss of such frames would be reflected in the received data stream as a loss of non-consecutive frames and; hence, voice quality would not be as severely affected as in the first embodiment discussed above, i.e., with no interleaving. In addition, the undesirable latency that has been introduced into the system is much less than the data latency introduced in the odd-even interleaving discussed above, e.g., the data stream is received at $t_{10}$, which is much earlier than in the case of odd-even interleaving in which the data stream is received at $t_{14}$.

Figure 2:
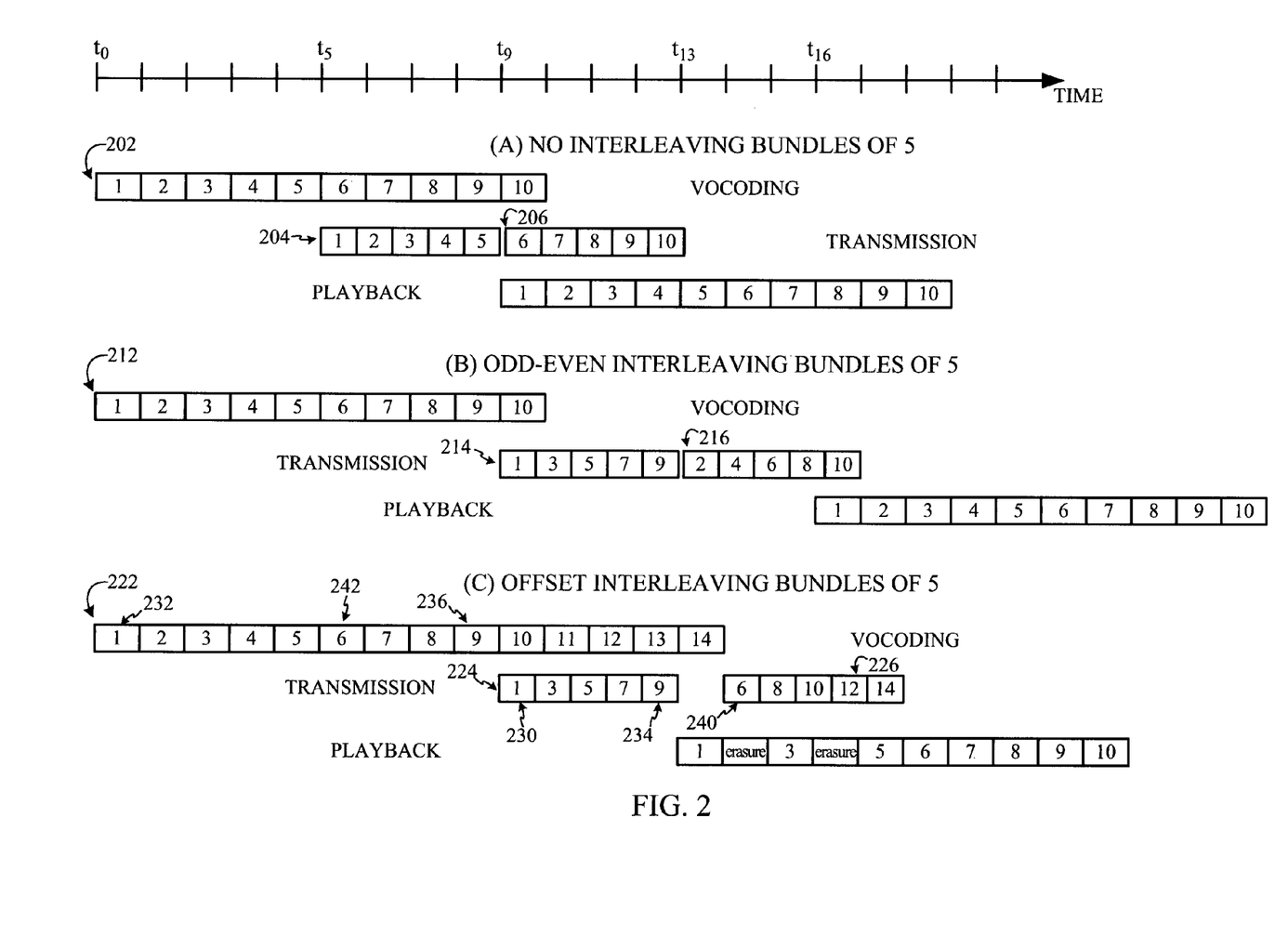
FIG. 2 illustrates another offset interleaving scheme, according to a second embodiment.

FIG. 2 (A) illustrates one embodiment of transmitting vocoder frames in bundles (packets) of five frames. A portion of the data stream 202 is shown to be transmitted in two packets 204 and 206. Packet 204 includes the first five vocoder frames and packet 206 includes the following five vocoder frames of data stream 202. Packet 204 gets transmitted at $t_5$, after packet 204 is filled up with the first five consecutive vocoder frames of data stream 202, according to this embodiment. Similarly, packet 206 gets transmitted at $t_9$, after packet 206 is filled up with the second five consecutive vocoder frames of data stream 202, according to this embodiment. At the receiver, the first data vocoder frame of the first packet 204 is received at $t_9$, followed by the remaining frames. According to this embodiment, if some consecutive vocoder frames in a transmitted packet were lost, the loss of such frames would be reflected in the received data stream as a loss of consecutive frames and; hence, voice quality would severely suffer.

FIG. 2 (B) illustrates another embodiment of transmitting vocoder frames in bundles (packets) of five frames. A portion of the data stream 212 is shown to be transmitted in two packets 214 and 216. Packet 214 includes the first five odd-numbered vocoder frames and packet 216 includes the interleaving five even-numbered vocoder frames of data stream 212. Here, packet 214 gets transmitted at $t_9$, after packet 214 is filled up with five vocoder frames, e.g., 1, 3, 5, 7, and 9, according to this embodiment. Similarly, packet 216 gets transmitted at $t_{13}$, after packet 216 is filled up with five vocoder frames, e.g., 2, 4, 6, 8, and 10, according to this embodiment. At the receiver, the first data vocoder frame of the first packet 214 is received at $t_{16}$, followed by the remaining frames. According to this odd-even embodiment, if some consecutive vocoder frames in a transmitted packet were lost, the loss of such frames would be reflected in the received data stream as a loss of intermittent frames and; hence, voice quality would not be as severely affected as in the first embodiment discussed above, i.e., with no interleaving. However, undesirable latency has been introduced into the system, e.g., the data stream is received at $t_{16}$, which results in more delay as compared with the time delay of $t_9$ in no-interleaving embodiment.

FIG. 2 (C) illustrates another embodiment of transmitting vocoder frames in bundles (packets) of five frames. A portion of the data stream 222 is shown to be transmitted in two packets 224 and 226. Packet 224 includes five vocoder frames and packet 226 includes another five vocoder frames of data stream 222, as discussed below. The packet 224 gets transmitted at $t_9$, after packet 224 is filled up with five vocoder frames, e.g., 1, 3, 5, 7, and 9, according to one embodiment. Similarly, packet 226 gets transmitted at $t_{14}$, after packet 226 is filled up with five vocoder frames, e.g., 6, 8, 10, 12, and 14, according to one embodiment. At the receiver, the first data vocoder frame of the first packet 224 is received at $t_{13}$, followed by the remaining frames. According to this embodiment, if some consecutive vocoder frames in a transmitted packet were lost, the loss of such frames would be reflected in the received data stream as a loss of non-consecutive frames and; hence, voice quality would not be as severely affected as in the first embodiment discussed above, i.e., with no interleaving. In addition, the undesirable latency that has been introduced into the system is much less than the latency introduced in the odd-even interleaving discussed above, e.g., the data stream is received at $t_{13}$, much earlier than in the case of odd-even interleaving in which the data stream is received at $t_{16}$.

In one embodiment, given a time sequence of output vocoder frames numbered 0 . . . n, and a bundling factor "B," the frame number "f" that goes in the "i"th location of the "k"th packet may be determined using the following formulae:

If B is odd:

$$f=kB+2i$$

If B is even:

$$f=kB+2i \quad i<B/2$$

$$f=kB+2i-1 \quad i>=B/2$$

Where:
B is the bundling factor (e.g. 4 or 5 vocoder frames per packet, as in FIG. 1 and FIG. 2, respectively)
f is the frame number, numbered from 0,
k is the packet number, numbered from 0, and
i is the location of the vocoder frame in the packet, numbered from 0 to B−1.

The first few packets for various bundling factors are shown in Table 1:

TABLE 1

Offset Interleaving for Various Bundling Factors

| Bundling Factor | First Interleave Packet | Second Interleave Packet | Third Interleave Packet | Fourth Interleave Packet |
|---|---|---|---|---|
| 2 | 0, 1 | 2, 3 | 4, 5 | 6, 7 |
| 3 | 0, 2, 4 | 3, 5, 7 | 6, 8, 10 | 9, 11, 13 |
| 4 | 0, 2, 3, 5 | 4, 6, 7, 9 | 8, 10, 11, 13 | 12, 14, 15, 17 |
| 5 | 0, 2, 4, 6, 8 | 5, 7, 9, 11, 13 | 10, 12, 14, 16, 18 | 15, 17, 19, 21, 23 |
| 6 | 0, 2, 4, 5, 7, 9 | 6, 8, 10, 11, 13, 15 | 12, 14, 16, 17, 19, 21 | 18, 20, 22, 23, 25, 27 |

Note that for bundling factors, e.g., 3 and above, some initial frames may not be transmitted. For example, with a bundling factor of 5, frames 1 and 3 are not transmitted, as shown in FIG. 2 (C). However, these missing frames are not consecutive frames in the received data stream, and the loss occurs only at the beginning of media transmission; therefore, their loss is generally acceptable.

For example for B=4, as shown in FIG. 1 (C), for the first frame 130 (i=0) of the first packet 124 (k=0), , the frame number of the frame sequence 122 that goes into the first packet 124 would be f=0, corresponding to the first frame in the frame sequence 122, as designated by 132. This frame location is determined by f=kB+2i formula (B is even and i=0<B/2=4/4=2). Similarly, for B=4, as shown in FIG. 1 (C), for the fourth frame 134 (i=3) of the first packet 124 (k=0), the frame number of the frame sequence 122 goes into the first packet 124 would be f=5, corresponding to the sixth frame in the frame sequence 122, as designated by 136. This frame location is determined by f=kB+2i−1 formula (B is even and i=3>B/2=4/4=2).

For B=4, as shown in FIG. 1 (C), for the first frame 140 (i=0) of the second packet 126 (k=1), the frame number of the frame sequence 122 that goes into the second packet 126 would be f=4, corresponding to the fifth frame in the frame sequence 122, as designated by 142. This frame location is determined by f=kB+2i formula (B is even and i=0<B/2=4/4=2).

For B=5, as shown in FIG. 2 (C), for the first frame 230 (i=0) of the first packet 224 (k=0), the frame number of the frame sequence 222 that goes into the first packet 224 would be f=0, corresponding to the first frame in the frame sequence 122, as designated by 232. This frame location is determined by f=kB+2i formula (B is odd). Similarly, for B=5, as shown in FIG. 2 (C), for the fifth frame 234 (i=4) of the first packet 224 (k=0), the frame number of the frame sequence 222 that goes into the first packet 224 would be f=8, corresponding to the ninth frame in the frame sequence 222, as designated by 236. This frame location is determined by f=kB+2i formula (B is even).

For B=5, as shown in FIG. 2 (C), for the first frame 240 (i=0) of the second packet 226 (k=1), the frame number of the frame sequence 222 that goes into the second packet 226 would be f=5, corresponding to the sixth frame in the frame sequence 222, as designated by 242. This frame location is determined by f=kB+2i formula (B is odd). It is noted that packet 226 includes a portion of the second odd-even interleaved packet 216, e.g., frames 6, 8, 10, and a portion of the fourth odd-even interleaved packet (not shown in FIG. 2), e.g., frames 12 and 14, wherein these two portions are offset portions of the odd-even interleaved packets.

The offset interleaving as disclosed above reduces the undesired time delay while improving quality in the case of packet loss. Therefore, other embodiments of filling the packets with offset portions of the odd-even interleaved packets would be equivalent to the disclosed embodiment.

Figure 3:
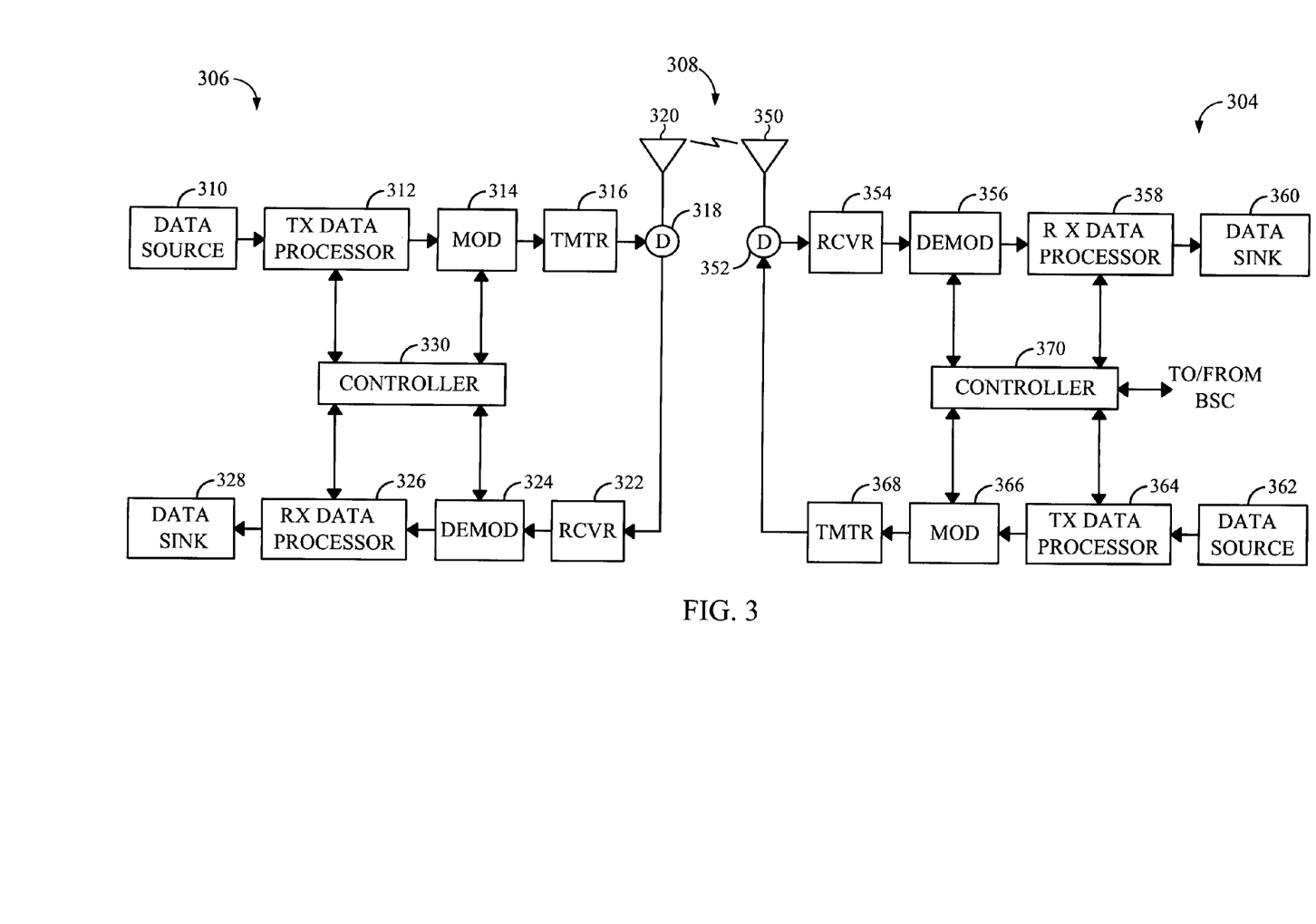
FIG. 3 illustrates one embodiment for an infrastructure for implementing various disclosed embodiments.

FIG. 3 is a simplified block diagram of one embodiment of an infrastructure including a base station/base station controller (BS/BSC) 304 and a communication device 306, which are capable of implementing various disclosed embodiments. For a particular media communication, voice, data, packet data, and/or alert messages may be exchanged between BS/BSC 304 and communication device 306, via an air interface 308. Various types of messages may be transmitted, such as messages used to establish a communication session between the base station and the communication device, registration and paging messages, and messages used to control a data transmission (e.g., power control, data rate information, acknowledgment, and so on). Some of these message types are described in further detail below.

For the reverse link, at communication device 306, voice and/or packet data (e.g., from a data source 310) and messages (e.g., from a controller 330) are provided to a transmit (TX) data processor 312, which formats and encodes the data and messages with one or more coding schemes to generate coded data. Each coding scheme may include any combination of cyclic redundancy check (CRC), convolutional, turbo, block, and other coding, or no coding at all. The voice, packet data, and messages may be coded using different schemes, and different types of messages may be coded differently.

The coded data is then provided to a modulator (MOD) 314 and further processed (e.g., covered, spread with short PN sequences, and scrambled with a long PN sequence assigned to the communication device). The modulated data is then provided to a transmitter unit (TMTR) 316 and conditioned (e.g., converted to one or more analog signals, amplified, filtered, and quadrature modulated) to generate a reverse link signal. The reverse link signal is routed through a duplexer (D) 318 and transmitted via an antenna 320 to BS/BSC 304.

At BS/BSC 304, the reverse link signal is received by an antenna 350, routed through a duplexer 352, and provided to a receiver unit (RCVR) 354. Alternatively, the antenna may be part of the wireless operator network, and the connection between the antenna and the BS/BSC may be routed through the Internet. BS/BSC 304 may receive media information and alert messages from communication device 306. Receiver unit 354 conditions (e.g., filters, amplifies, down converts, and digitizes) the received signal and provides samples. A demodulator (DEMOD) 356 receives and processes (e.g., despreads, decovers, and pilot demodulates) the samples to provide recovered symbols. Demodulator 356 may implement a rake receiver that processes multiple instances of the received signal and generates combined symbols. A receive (RX) data processor 358 then decodes the symbols to recover the data and messages transmitted on the reverse link. The recovered voice/packet data is provided to a data sink 360 and the recovered messages may be provided to a controller 370. Controller 370 may include instructions for receiving and sending information, receiving and sending responses to messages, interleaving a stream of media frames for transmission over a communication network, comprising, defining a plurality of packets, and distributing a stream of media frames among the packets. The processing by demodulator 356 and RX data processor 358 are complementary to that performed at remote access device 306. Demodulator 356 and RX data processor 358 may further be operated to process multiple transmissions received via multiple channels, e.g., a reverse fundamental channel (R-FCH) and a reverse supplemental channel (R-SCH). Also, transmissions may be simultaneously from multiple communication devices, each of which may be transmitting on a reverse fundamental channel, a reverse supplemental channel, or both.

On the forward link, at BS/BSC 304, voice and/or packet data (e.g., from a data source 362) and messages (e.g., from controller 370) are processed (e.g., formatted and encoded) by a transmit (TX) data processor 364, further processed (e.g., covered and spread) by a modulator (MOD) 366, and conditioned (e.g., converted to analog signals, amplified, filtered, and quadrature modulated) by a transmitter unit (TMTR) 368 to generate a forward link signal. The forward link signal is routed through duplexer 352 and transmitted via antenna 350 to remote access device 306. Forward link signals include paging signals.

At communication device 306, the forward link signal is received by antenna 320, routed through duplexer 318, and provided to a receiver unit 322. Receiver unit 322 conditions (e.g., down converts, filters, amplifies, quadrature modulates, and digitizes) the received signal and provides samples. The samples are processed (e.g., despreaded, decovered, and pilot demodulated) by a demodulator 324 to provide symbols, and the symbols are further processed (e.g., decoded and checked) by a receive data processor 326 to recover the data and messages transmitted on the forward link. The recovered data is provided to a data sink 328, and the recovered messages may be provided to controller 330. Controller 330 may include instructions for receiving and sending information, receiving and sending responses to messages, interleaving a stream of media frames for transmission over a communication network, comprising, defining a plurality of packets, and distributing a stream of media frames among the packets.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method for interleaving a stream of media frames for transmission over a communication network that minimize latency and require no tracking state information for de-interleaving the stream of media frames into received packets, comprising:
defining a plurality of packets, each packet having a size determined by a bundling factor; and
distributing a stream of media frames among the plurality of packets, such that each packet includes non-consecutive frames of the media stream and at least one packet is different from an odd-even interleaved packet;
wherein each packet has the same size and at least one media frame of the stream of media frames is not distributed in any packet, and wherein the at least one media frame is omitted based on the bundling factor.

2. A method for interleaving a stream of media frames for transmission over a communication network that minimize latency and require no tracking state information for de-interleaving the stream of media frames into received packets, comprising:
defining a plurality of packets, each packet having a size determined by a bundling factor; and
interleaving a stream of media frames among the plurality of packets, such that each packet includes successively sequenced odd or even interleaved frames, respectively, each packet including a starting frame that is offset in sequence number with respect to the starting frame in a previous packet, wherein the starting frame of each packet depends on the bundling factor;
wherein each packet has the same size.

3. A method for interleaving a stream of media frames for transmission over a communication network that minimize latency and require no tracking state information for deinterleaving the frames into the received packets, comprising:
defining a plurality of packets, each packet having a predetermined size (bundling factor) and a packet number; and
interleaving a stream of media frames among the packets, wherein each packet has a packet number and each frame has a frame number, such that each packet includes frames of the media stream at a location chosen according to the following scheme:
If B is odd, $$f=kB+2i$$

If B is even:

$$f=kB+2i \; i<B/2$$

$$f=kB+2i-1 \; i>=B/2$$

Where: B is the bundling factor,
f is the frame number, numbered from 0,
k is the packet number, numbered from 0, and
i is the location of the vocoder frame in the packet, numbered from 0 to B−1.

4. An apparatus for interleaving a stream of media frames for transmission over a communication network that minimize latency and require no tracking state information for de-interleaving the stream of media frames into received packets, comprising:
means for defining a plurality of packets, each packet having a size determined by a bundling factor; and
means for distributing a stream of media frames among the plurality of packets, such that each packet includes non-consecutive frames of the media stream and at least one packet is different from an odd-even interleaved packet;
wherein:
each packet has the same size and at least one media frame of the stream of media frames is not distributed in any packet, and wherein the at least one media frame is omitted based on the bundling factor.

5. An apparatus for interleaving a stream of media frames for transmission over a communication network that minimize latency and require no tracking state information for de-interleaving the stream of media frames into received packets, comprising:

means for defining a plurality of packets, each packet having a size determined by a bundling factor; and means for interleaving a stream of media frames among the packets, such that each packet includes successively sequenced odd or even interleaved frames, respectively, each packet including a starting frame that is offset in sequence number with respect to the starting frame in a previous packet, wherein the starting frame of each packet depends on the bundling factor;

wherein each packet has the same size.

6. An apparatus for interleaving a stream of media frames for transmission over a communication network that minimize latency and require no tracking state information for de-interleaving the frames into the received packets, comprising:

means for defining a plurality of packets, each packet having a predetermined size (bundling factor) and a packet number; and means for interleaving a stream of media frames among the packets, wherein each packet has a packet number and each frame has a frame number, such that each packet includes frames of the media stream at a location chosen according to the following scheme:

If B is odd, $$f=kB+2i$$

If B is even, $$f=kB+2i\ i<B/2$$

$$f=kB+2i-1\ i>=B/2$$

Where: B is the bundling factor,
f is the frame number, numbered from 0,
k is the packet number, numbered from 0, and
i is the location of the vocoder frame in the packet, numbered from 0 to B−1.

7. A non-transitory computer-readable medium encoded thereon with instructions that when executed cause an apparatus to carry out a method for interleaving a stream of media frames for transmission over a communication network that minimize latency and require no tracking state information for de-interleaving the stream of media frames into received packets, the method comprising:

define a plurality of packets, each packet having a size determined by a bundling factor; and distribute a stream of media frames among the plurality of packets, such that each packet includes non-consecutive frames of the media stream and at least one packet is different from an odd-even interleaved packet;

wherein:
each packet has the same size and at least one media frame of the stream of media frames is not distributed in any packet, and wherein the at least one media frame is omitted based on the bundling factor.

8. A non-transitory computer-readable medium encoded thereon with instructions that when executed cause an apparatus to carry out a method for interleaving a stream of media frames for transmission over a communication network that minimize latency and require no tracking state information for de-interleaving the stream of media frames into received packets, the method comprising:

distribute a plurality of packets, each packet having a size determined by a bundling factor; and distribute a stream of media frames among the packets, such that each packet includes successively sequenced odd or even interleaved frames, respectively, each packet including a starting frame that is offset in sequence number with respect to the starting frame in a previous packet, wherein the starting frame of each packet depends on the bundling factor; wherein each packet has the same size.

9. A non-transitory computer-readable medium encoded thereon with instructions that when executed cause an apparatus to carry out a method for interleaving a stream of media frames for transmission over a communication network that minimize latency and require no tracking state information for de-interleaving the frames into the received packets, the method comprising:

distribute a plurality of packets, each packet having a size determined by a bundling factor and a packet number; and distribute a stream of media frames among the packets, wherein each packet has a packet number and each frame has a frame number, such that each packet includes frames of the media stream at a location chosen according to the following scheme:

If B is odd, $$f=kB+2i$$

If B is even, $$f=kB+2i\ i<B/2$$

$$f=kB+2i-1\ i>=B/2$$

Where: B is the bundling factor,
f is the frame number, numbered from 0,
k is the packet number, numbered from 0, and
i is the location of the vocoder frame in the packet, numbered from 0 to B−1.

10. A processor programmed with executable instructions for interleaving a stream of media frames for transmission over a communication network that minimize latency and require no tracking state information for de-interleaving the stream of media frames into received packets, the instructions comprising:

defining a plurality of packets, each packet having a size determined by a bundling factor; and distributing a stream of media frames among the plurality of packets, such that each packet includes non-consecutive frames of the media stream and at least one packet is different from an odd-even interleaved packet;

wherein each packet has the same size and at least one media frame of the stream of media frames is not distributed in any packet, and wherein the at least one media frame is omitted based on the bundling factor.

11. A processor programmed with executable instructions for interleaving a stream of media frames for transmission over a communication that minimize latency and require no tracking state information for de-interleaving the stream of media frames into received packets, the instructions comprising:

defining a plurality of packets, each packet having a size determined by a bundling factor; and distributing a stream of media frames among the packets, such each packet includes successively sequenced odd or even interleaved frames, respectively, each packet including a starting frame that is offset in sequence number with respect to the starting frame in a previous packet, wherein the starting frame of each packet depends on the bundling factor; wherein each packet has the same size.

12. A processor programmed with executable instructions for interleaving a stream of media frames for transmission over a communication network that minimize latency and require no tracking state information for de-interleaving the frames into the received packets, the instructions comprising:
  defining a plurality of packets, each packet having a size determined by a bundling factor and a packet number; and
  distributing a stream of media frames among the packets, wherein each packet has a packet number and each frame has a frame number, such that each packet includes frames of the media stream at a location chosen according to the following scheme:
  If B is odd, $f=kB+2i$ If B is even, $f=kB+2i\ i<B/2$ $f=kB+2i-1\ i>=B/2$ Where: B is the bundling factor,
  f is the frame number, numbered from 0,
  k is the packet number, numbered from 0, and
  i is the location of the vocoder frame in the packet, numbered from 0 to B−1.

13. A communication device comprising:
  a controller and
  a transmitter coupled to the controller;
  wherein the controller includes instructions for interleaving a stream of media frames for transmission over a communication network that minimize latency and require no tracking state information for de-interleaving the stream of media frames into received packets, the instructions comprising:
  defining a plurality of packets, each packet having a size determined by a bundling factor; and
  distributing a stream of media frames among the plurality of packets, such that each packet includes non-consecutive frames of the media stream and at least one packet is different from an odd-even interleaved packet; wherein each packet has the same size and at least one media frame of the stream of media frames is not distributed in any packet, and wherein the at least one media frame is omitted based on the bundling factor.

14. A communication device comprising:
  a controller and
  a transmitter coupled to the controller;
  wherein the controller includes instructions for interleaving a stream of media frames for transmission over a communication network that minimize latency and require no tracking state information for de-interleaving the stream of media frames into received packets, the instructions comprising:
  defining a plurality of packets, each packet having a size determined by a bundling factor; and
  interleaving a stream of media frames among the plurality of packets, such that each packet includes successively sequenced odd or even interleaved frames, respectively, each packet including a starting frame that is offset in sequence number with respect to the starting frame in a previous packet, wherein the starting frame of each packet depends on the bundling factor; and wherein each packet has the same size.

15. A communication device comprising:
  a controller and
  a transmitter coupled to the controller;
  wherein the controller includes instructions for interleaving a stream of media frames for transmission over a communication network that minimize latency and require no tracking state information for de-interleaving the frames into the received packets, the instructions comprising:
  defining a plurality of packets, each packet having a predetermined size (bundling factor) and a packet number; and
  interleaving a stream of media frames among the packets, wherein each packet has a packet number and each frame has a frame number, such that each packet includes frames of the media stream at a location chosen according to the following scheme:
  If B is odd, $f=kB+2i$ If B is even, $f=kB+2i\ i<B/2$ $f=kB+2i-1\ i>=B/2$ Where: B is the bundling factor,
  f is the frame number, numbered from 0,
  k is the packet number, numbered from 0, and
  i is the location of the vocoder frame in the packet, numbered from 0 to B−1.

* * * * *